United States Patent Office 2,849,134
Patented Aug. 26, 1958

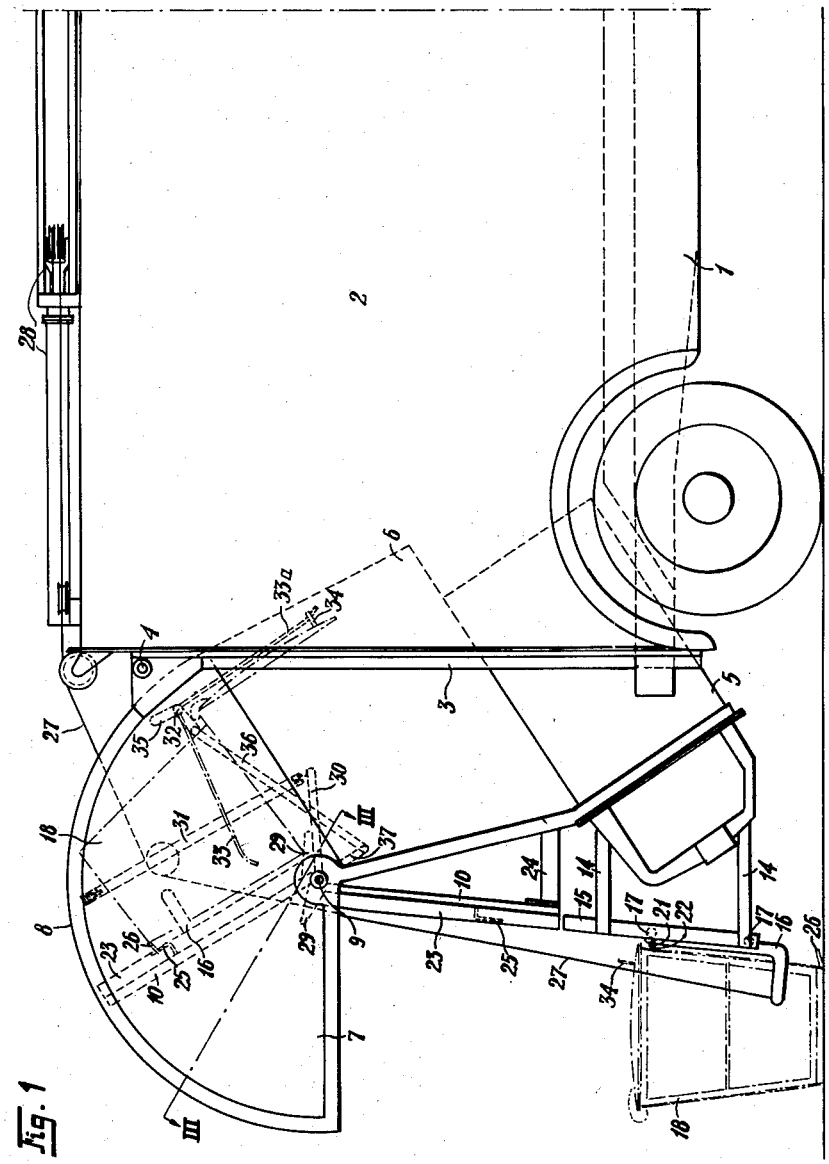

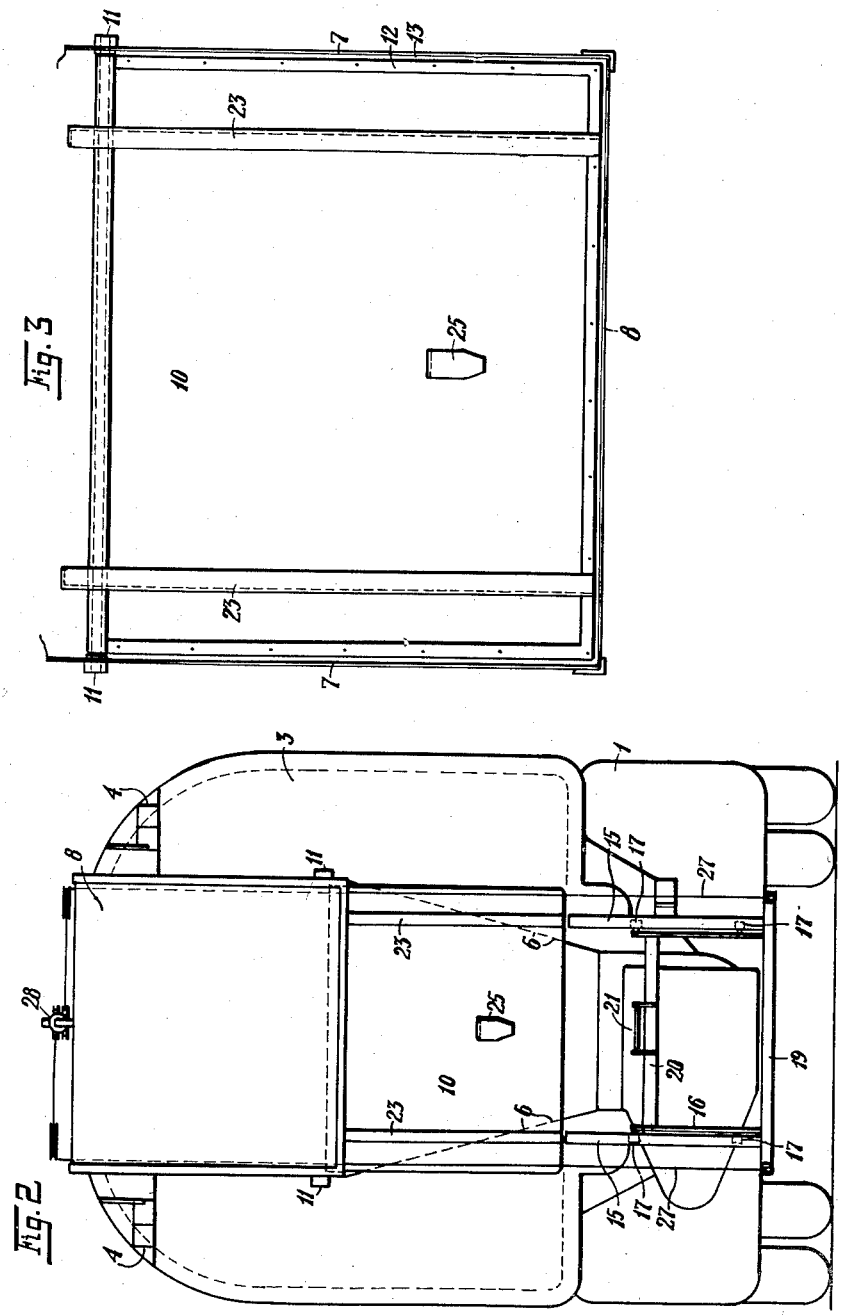

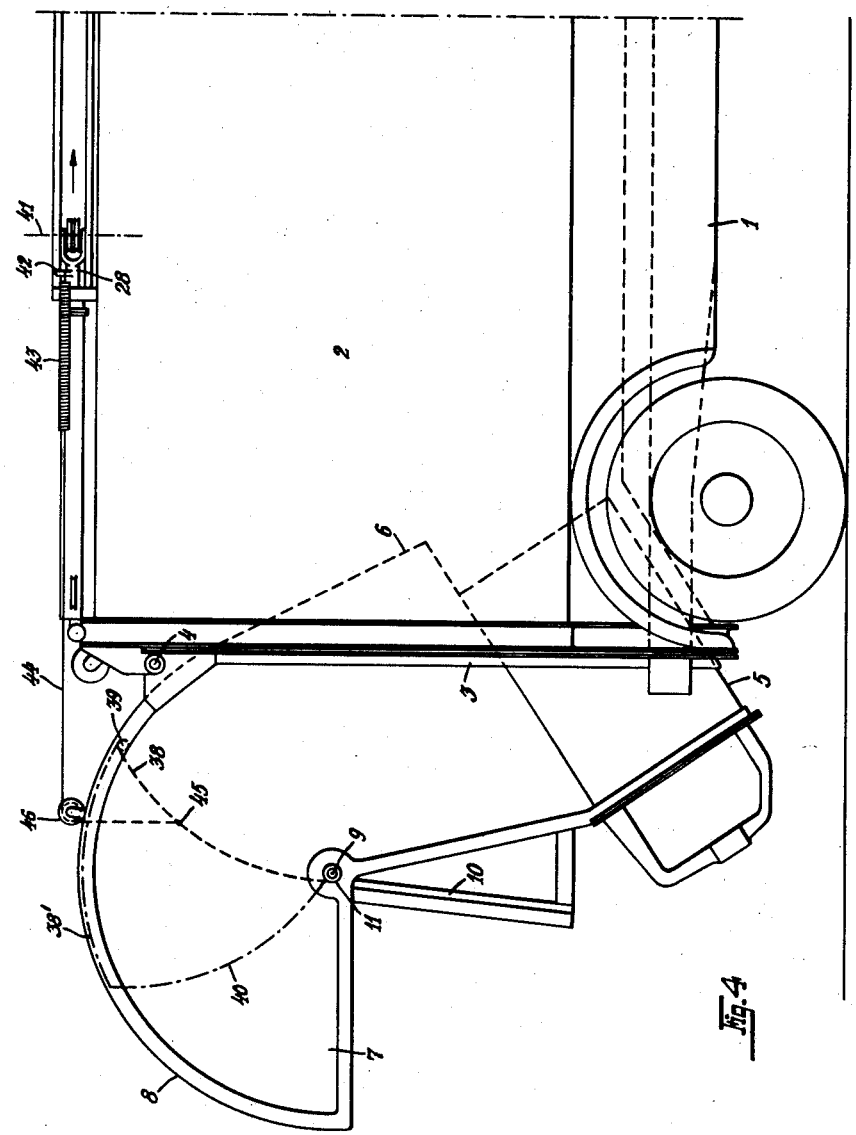

2,849,134
REFUSE COLLECTING VEHICLE
Hilding Linde, Kalmar, Sweden

Application June 21, 1955, Serial No. 516,931

5 Claims. (Cl. 214—302)

The invention relates to a refuse collecting vehicle provided with a device for dustless emptying of dustbins into a collecting container.

An object of the invention is to provide an emptying device, by means of which dustbins of different kinds and form can be emptied. This is of advantage especially in case a community turns over from the open to a dustless emptying system, as the dustbins can still be used and need not be discarded.

Another object of the invention is to provide a simple device for sealing an emptying hood during the discharge, which device is not brought in contact with the refuse and which prevents rattling.

A further object of the invention is to avoid manual operation after the dustbin has been placed on a carrier at a low level and to cause the dustbin to be emptied from a higher level.

With these and other objects and advantages in view the invention is hereinafter fully described, reference being made to the accompanying drawing, in which:

Figure 1 is a side view of the rear portion of a refuse collecting vehicle with an emptying device according to one embodiment of the invention, Figure 2 is a rear end view of the vehicle, Figure 3 is a sectional view on line III—III in Figure 1 but with the sealing flap swung into the hood, and Figure 4 is a side view of another embodiment.

A collecting container 2 on a chassis has its rear wall 3 pivoted at 4 for discharge of the container. In this wall a discharge passage 6 to a feeding screw 5 is mounted, and the passage has an upper extension forming an emptying hood having two vertical and parallel side walls 7 in the form of a sector of a circle and an arcuate cover 8 having the center of rotation and extending between the side walls. The hood thus formed has its entrance opening directed downwards.

A normally vertical sealing flap 10 is pivoted at its upper edge in the axis 9 by means of a shaft 11. Along three edges of the flap a rubber strip 13 is secured by strip irons 12 for sealing against the side walls 7 and the cover 8 of the hood.

By means of arms 14 two U-shaped guide rails 15 are secured to the support for the screw 5 to serve as guides for a bin-carrier 16 carrying a square dustbin 18 and having four rollers 17 running in the rails 15. The carrier has a lower transverse and bow-shaped frame member 19, against which the bin rests, and an upper transverse frame member 20 for a coupling bow 21 engaged by a coupling hook 22 on the bin. Two guide rails 23 forming extensions of the guide rails 15 are secured to the flap 10 which bears against a fixed limit stop 24 and thereby holds the rails 23 in a correct position relative to the rails 15. The flap is further provided with a downwardly directed coupling hook 25 to engage a corresponding coupling bow 26 on the bottom ring of the bin. Two wires 27 are secured to the carrier and pass over guide rolls to a lift jack 28 for hoisting up the carrier.

For coupling the bin to the carrier the bin may be placed on a hand-cart or on the ground, and when the carrier is hoisted up the bow 21 engages the hook 22 on the bin in the position shown in Figure 1 for lifting the bin. The carrier will thereafter pass from the fixed guides 15 to the guides 23 on the flap, and before the carrier reaches its upper end position the bow 26 on the bin engages the hook 25 so that the bin will be connected with the flap and rigidly secured to the carrier. From this end position the wires will swing the flap, the carrier and the bin as a unit around the shaft 11 and into the hood to the emptying position shown with dash lines in Figure 1.

At the upper ends of the guide rails 23 two arms 29 are provided for cooperation with two arms 30 mounted swingable around the axis 9 and connected at their upper ends with two tension springs 31. When the bin has occupied its emptying position the springs are stretched so that they after emptying of the bin swing the carrier back towards a substantially horizontal position, from which the movable system continues its motion by means of gravity towards the stop 24. The carrier is thereafter lowered to a position in which the bin is disconnected from the carrier.

If the bins are provided with a hinged cover this cover is automatically opened by means of an arm 33 which is pivoted at 32 and normally occupies a position in which a handle 34 on the cover engages the arm as the bin is swung upwards. The arm 33 is secured to a lever 35 which by a link 36 is connected with an arm 37 pivoted at the axis 9. When the bin cover is coupled to the arm 33 the flap turns the arm 37 and thereby also the arm 33 and the cover to the position 33a of the arm 33.

The emptying device described above effects a sealing of the hood during the emptying operation independently of the size and form of the bin. When not in use as well as during transport of the vehicle the flap may rest swung into the hood. Such a closure, however, can also be performed automatically by a separate shutter as shown in Figure 4. During the time the flap is not operating the hood is closed by a shutter 38 of substantially the same width as the hood. It is mounted swingable on a shaft 39 which is located close to the cylindrical cover and extends parallelly to the axis 9. The free end of the shutter rests against the shaft 11 of the flap 10, and the shutter has a cylindrical form corresponding to that of the cover 8. In its upper end position $38^1$ the shutter extends closely along the cover, and its free end moves along the circle 40. At the piston 42 of the jack 28 one end of a spring 43 is fastened, which is coiled so as to obtain a certain pre-stress, whereas its other end by means of a wire 44 passing over a wheel 46 and through a slot in the cover is connected with the shutter 38 in the point 45. When the jack starts its motion from its position 41 in direction of the arrow, the shutter 38 is swung to the position $38^1$, and on further motion of the jack the spring will only be stretched while the shutter remains in its position. The flap 10 with the bin passes now by to the emptying position, and after its return the shutter falls down by its own gravity or by means of a spring.

I claim:

1. A refuse collecting vehicle, comprising a refuse collecting container, a hood which is formed by two vertical side walls connected by an arcuate cover and has an entrance mouth opening directed downwardly, a shutter pivoted at one end in the center of said arcuate cover and extending in its normal position with a free opposite end directed downwardly, which shutter is adapted to be swung into the hood and has a form substantially corresponding to the axial section of the hood for closing the same, a movable dustbin carrier, guide members on said shutter for said carrier, and a hoisting device with cables passing through said hood to the carrier for lifting the carrier to an upper end position on the shutter and swinging the shutter and the carrier with a dustbin into a discharge position within the hood.

2. A refuse collecting vehicle as defined in claim 1, wherein the shutter is provided with resilient edge strips for sealing the space between the shutter and the walls of the hood.

3. A refuse collecting vehicle as defined in claim 1, wherein fixed guide members forming extensions of the guide members on the shutter are provided below the shutter.

4. A refuse collecting vehicle as defined in claim 1, wherein the shutter and the dustbin are provided with coupling members engaging automatically as the carrier with the dustbin reaches the upper end position on the shutter.

5. A refuse collecting vehicle as defined in claim 1, wherein a second shutter having the same arcuate form as the cover of the hood is pivoted at one end close to said cover and normally rests with its opposite end at the center of said cover, and that said shutter is connected with the hoisting device so as to be automatically opened for allowing the carrier to pass by.

References Cited in the file of this patent

FOREIGN PATENTS

| 75,946 | Austria | Mar. 26, 1919 |
| 591,436 | France | Apr. 9, 1925 |
| 681,323 | Great Britain | Oct. 22, 1952 |